US006963766B2

(12) United States Patent
Jung

(10) Patent No.: US 6,963,766 B2
(45) Date of Patent: Nov. 8, 2005

(54) HINGE MODULE FOR PORTABLE RADIO TERMINAL

(75) Inventor: Su-Yong Jung, Yong-in-shi (KR)

(73) Assignee: Samsung Electronics Co., Ltd. (KR)

( * ) Notice: Subject to any disclaimer, the term of this patent is extended or adjusted under 35 U.S.C. 154(b) by 500 days.

(21) Appl. No.: 10/027,022

(22) Filed: Dec. 20, 2001

(65) Prior Publication Data

US 2002/0086700 A1 Jul. 4, 2002

(30) Foreign Application Priority Data

Dec. 30, 2000 (KR) ........................................ 2000-87220

(51) Int. Cl.[7] ................................................ H04M 1/00
(52) U.S. Cl. ............................... 455/575.3; 455/575.4; 16/303
(58) Field of Search ........................... 455/575.3, 575.4, 455/550; 16/303

(56) References Cited

U.S. PATENT DOCUMENTS 5,996,178 A * 12/1999 Murray ........................ 16/303
6,085,387 A 7/2000 Han
6,292,980 B1 * 9/2001 Yi et al. ....................... 16/303

FOREIGN PATENT DOCUMENTS

EP 0 961 457 12/1999
EP 0961457 A2 * 12/1999
GB 2 333 558 7/1999
GB 2 337 899 12/1999
JP 08-065369 3/1996

OTHER PUBLICATIONS

First Office Action of The Patent Office of the People's Republic of China dated Apr. 18, 2003, issued in a counterpart application, namely, Appln. No. 01138391.7.
European Search Report dated Nov. 6, 2003 issued in a counterpart application, namely, Appln. No. 01130992.9.

* cited by examiner

*Primary Examiner*—Jean Gelin
*Assistant Examiner*—Pierre-Louis Desir
(74) *Attorney, Agent, or Firm*—Dilworth & Barrese LLP

(57) ABSTRACT

There is provided a hinge module for mechanically connecting a main body to a folder in a portable radio terminal. In the hinge module, a hinge shaft has an angled portion on one end and a shaft on the other end thereof, for rotating with the folder. A hinge cam is disposed to face the hinge shaft and has a pair of angled portions on the surface facing the hinge shaft, a valley portion between the angled portions, a fixing post along a rotating axis, and a guide protrusion for facilitating sliding of the hinge cam with respect to the hinge shaft while restricting rotational movement of the hinge cam. Each angled portion has a gentle slope and a steep slope that are asymmetrical sidewise. A hinge spring is disposed along the rotating axis and has one end connected to the fixing protrusion of the hinge cam, for providing restoring force to the hinge cam.

4 Claims, 5 Drawing Sheets

12 40 30 31a 31b 20 31 34 21 31b 32 22 31a 21b 21a 11 A1

HINGE MODULE FOR PORTABLE RADIO TERMINAL

PRIORTY

This application claims priority to an application entitled "Hinge Module for Portable Radio Terminal" filed in the Korean Industrial Property Office on Dec. 30, 2000 and assigned Serial No. 2000-87220, the contents of which are hereby incorporated by reference.

BACKGROUND OF THE INVENTION

1. Field of the Invention

The present invention relates generally to a hinge module for a portable radio terminal, and in particular, to a hinge device that allows a user to readily open a folder with a relatively small angle in a folder-type portable radio terminal.

2. Description of the Related Art

As portable radio terminals become commonplace, diverse functions and designs are developed for them. Diversity of functions as well as small size and lightweight construction becomes significant to the portable radio terminals. To satisfy the customers' demand, the terminals must be less bulky while their functions are maintained at the same level or at an improved level. As a most suitable candidate, folder-type terminals increasingly come to the market and are being developed to be scaled down and have a variety of functions.

A typical folder-type terminal has a hinge module on a hinge arm to raise a folder, or cover, at a particular angle. The hinge module has a hinge shaft installed rotatably within the folder, a hinge cam that retracts backward when it rotates in contact with an angled portion of the hinge shaft, and a spring for pressing the hinge cam within a hinge housing. Angled portions are symmetrically formed at both sides with respect to a valley portion at the center in the hinge cam. While rotating, the angled portion of the hinge shaft runs through the valley portion of the hinge cam to the angled portions thereof, thereby raising a folder or a flip (in the case of a flip-type terminal) at a predetermined angle.

Due to the sidewise symmetry of the angled portions of the conventional hinge cam, a movement stroke is half of the raising angle. This causes no problems to the operation of the flip in the flip-type terminal but increases user inconvenience in the folder-type terminal because the user extends his hand outward to open the folder.

SUMMARY OF THE INVENTION

It is, therefore, an object of the present invention to provide a hinge module for a portable radio terminal, for enabling a user to conveniently open the terminal.

It is another object of the present invention to provide a hinge module for a portable radio terminal, for enabling a user to readily open the terminal with a relatively small angle by reducing a movement stroke when opening the terminal.

The foregoing and other objects are achieved by a hinge module for mechanically connecting a main body to a folder in a portable radio terminal. In the hinge module, a hinge shaft has an angled portion on one end and a shaft on the other end thereof, for rotating with the folder. The shaft has a pair of flat portions and a pair of curved portions on one end thereof. A hinge cam is disposed to face the hinge shaft and has a pair of angled portions on the surface facing the hinge shaft, a valley portion between the angled portions, and a predetermined fixing protrusion along a rotating axis, for sliding with respect to the hinge shaft. Each angled portion has a gentle slope and a steep slope that are asymmetrical sidewise. A hinge spring is disposed along the rotating axis and has one end connected to the fixing protrusion of the hinge cam, for providing restoring force to the hinge cam. Within a hinge housing, the hinge shaft with one end protruded, the hinge cam, and the hinge spring are sequentially contained.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described hereinbelow with reference to the accompanying drawings. In the following description, well-known functions or constructions are not described in detail since they would obscure the invention in unnecessary detail.

Figure 1:
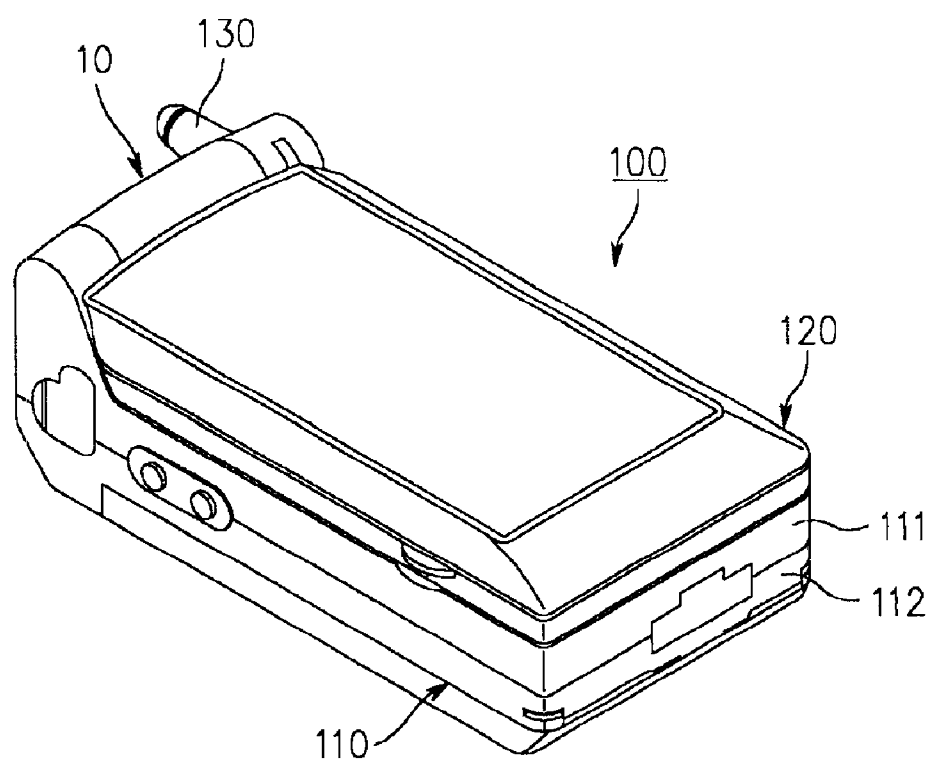
FIG. 1 is a perspective view of a typical portable radio terminal in a closed, or on-hook state.
Figure 2:
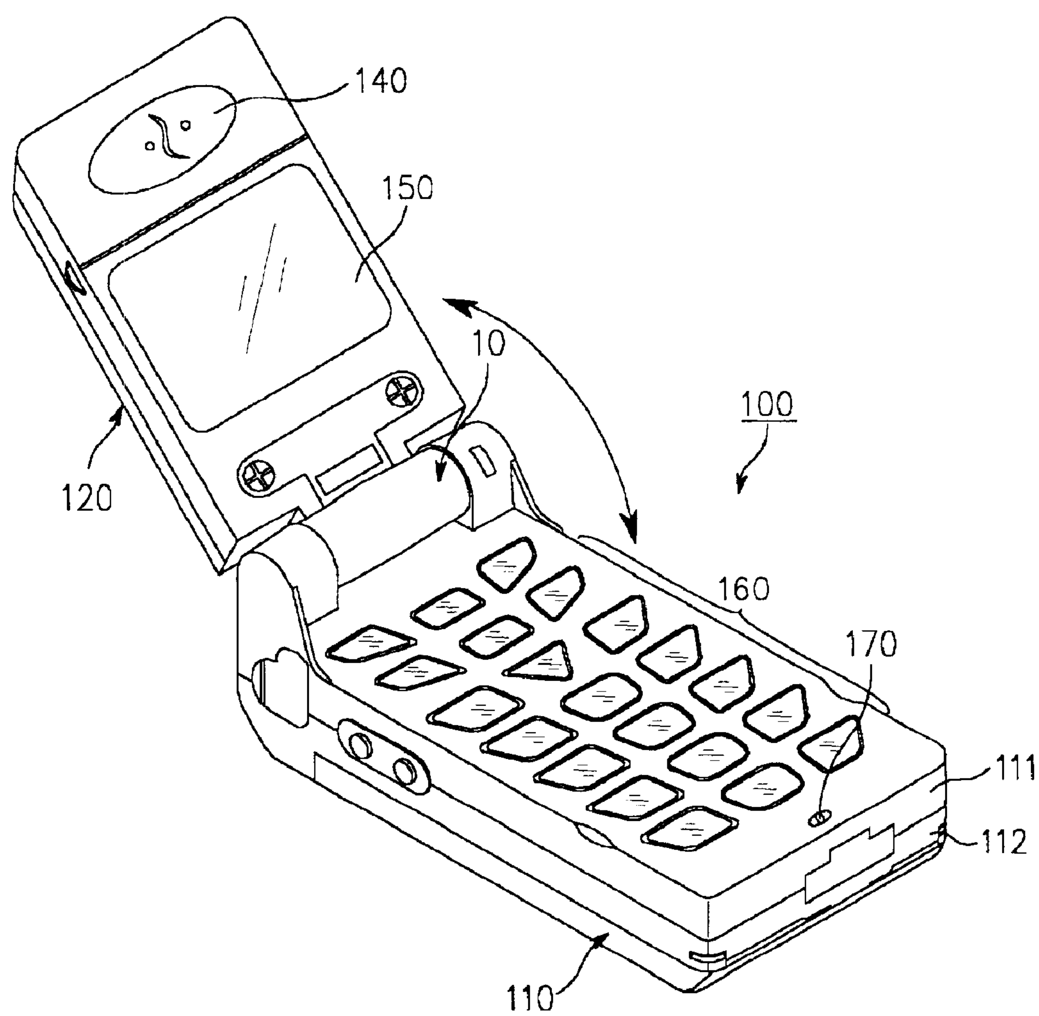
FIG. 2 is a perspective view of the typical portable radio terminal in an open, or off-hook state.

FIG. 1 is a perspective view of a typical portable radio terminal in a closed, or on-hook state and FIG. 2 is a perspective view of the typical portable radio terminal in an open, or off-hook state. Referring to FIGS. 1 and 2, the portable radio terminal 100 is comprised of a main body 110 with an upper casing frame 111 and a lower casing frame 112, a folder 120 rotatably mounted to the main body 110, and a hinge module 10 for facilitating movement of the folder 120 to an open position or a closed position with respect to the main body 110.

An antenna device 130 is located at an end of the uppermost side of the main body 110. An earpiece 140 is disposed on the surface of the folder 120 facing the main body 110. Under the earpiece 140 is located an LCD (Liquid Crystal Display) module 150. A keypad 160 and a microphone 170 are arranged on the main body 110.

Figure 3:
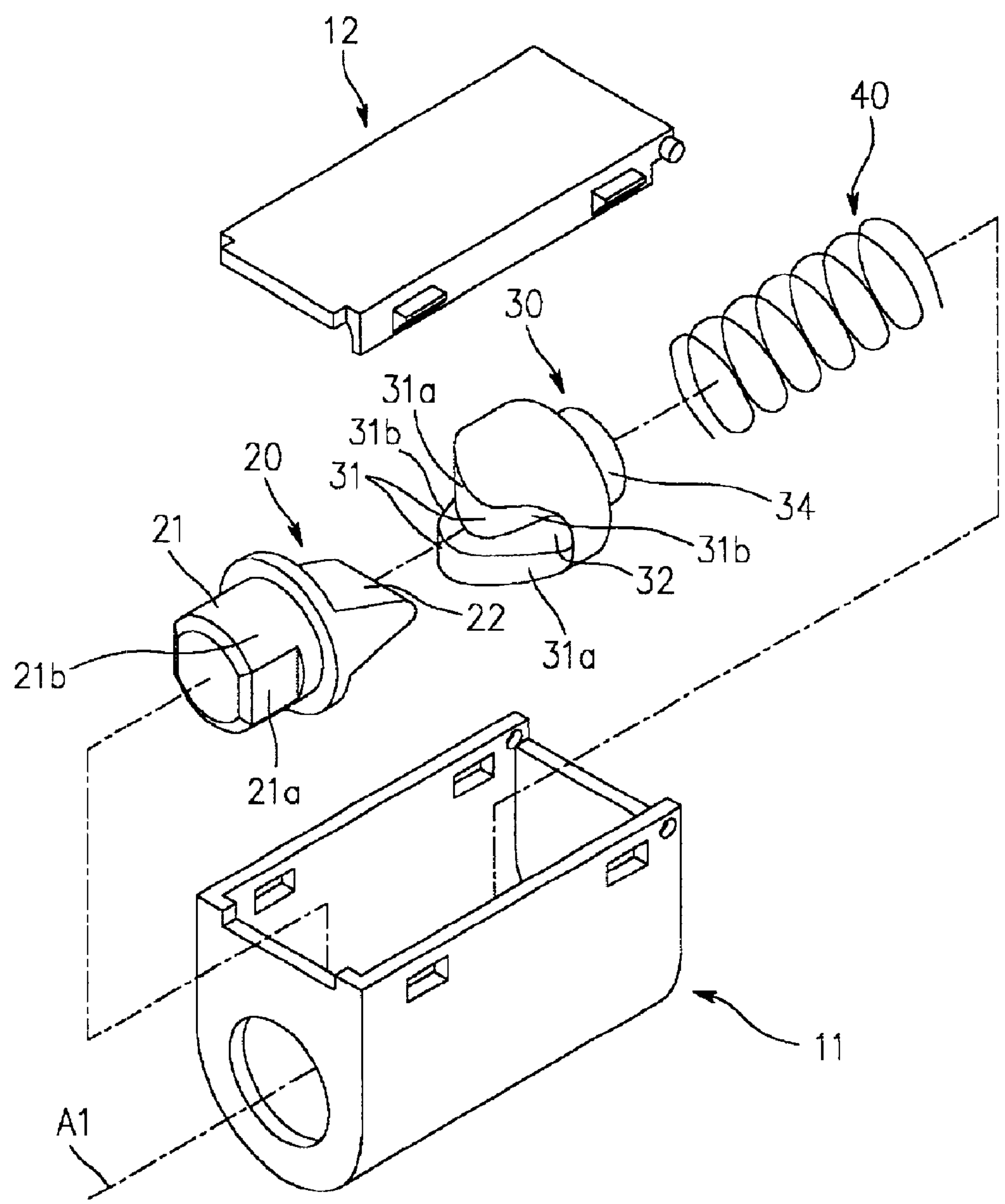
FIG. 3 is an exploded perspective view of a hinge module for a portable radio terminal according to a preferred embodiment of the present invention.
Figure 4:
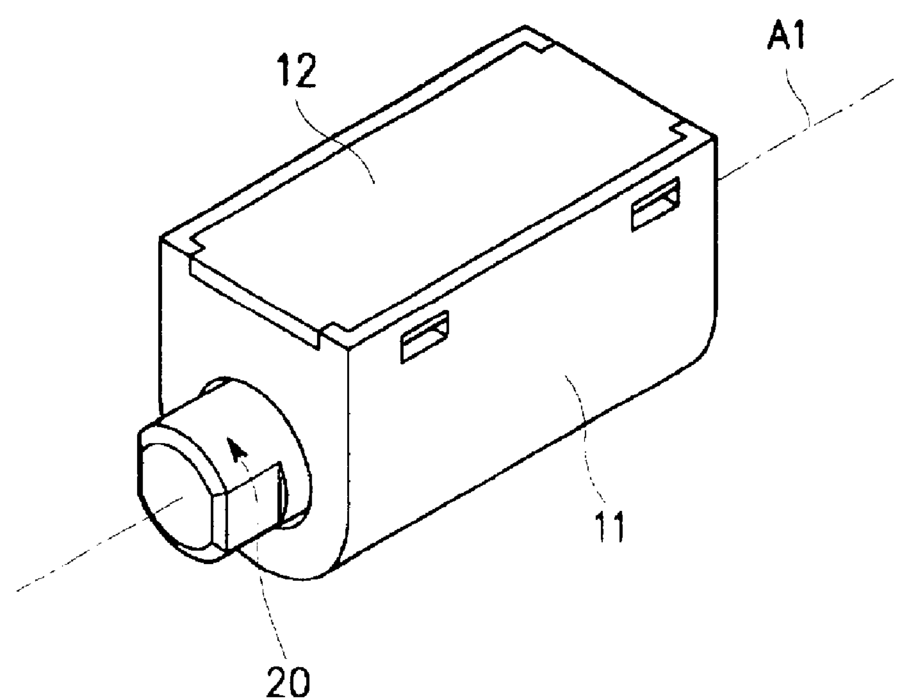
FIG. 4 is a perspective view of the hinge module assembled for the portable radio terminal according to the preferred embodiment of the present invention.
Figure 5:
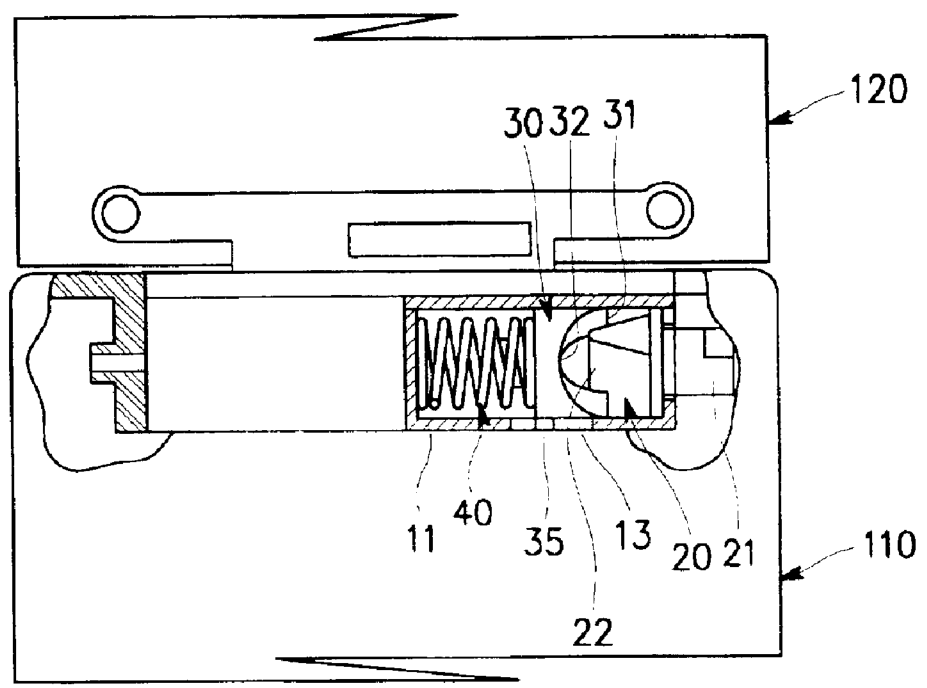
FIG. 5 is a partial sectional view of the hinge module attached in the portable radio terminal according to the preferred embodiment of the present invention.

FIG. 3 is an exploded perspective view of a hinge module for a portable radio terminal according to a preferred embodiment of the present invention, FIG. 4 is a perspective view of the hinge module assembled for the portable radio terminal, and FIG. 5 is a partial sectional view of the hinge module attached in the portable radio terminal.

Referring to FIGS. 3, 4, and 5, the hinge module 10 includes a hinge housing 11, a hinge shaft 20, a hinge cam 30, and a hinge spring 40. The hinge shaft 20, the hinge cam 30, and the hinge spring 40 are mounted along a rotating axis A1 within the hinge housing 11. The hinge shaft 20 and the hinge cam 30 are generally cylindrical and are arranged along the rotating axis. A hinge cover 12 may additionally be provided in a vertical direction to protect the hinge shaft 20, the hinge cam 30, and the hinge spring 40 within the hinge housing 11.

The hinge shaft 20 has a shaft 21 extending from one end and an angled portion 22 extending from the other end thereof. The shaft 21 is preferably generally cylindrical. A pair of flat portions 21*a* and a pair of curved portions 21*b* are formed face to face respectively on the outer circumferential surface of the shaft 21.

The hinge cam 30, against which the hinge shaft 20 slides, has angled portions 31 and a valley portion 32 on one end and a spring fixing post 34 extending from the other end thereof in the rotating axis direction. A guide protrusion 35 (see FIG. 5) is extended from under the hinge cam 30. The guide protrusion 35 is inserted into a guide hole 13 (see FIG. 5) of the hinge housing 11, for facilitating sliding linear movement of hinge cam 30 along the rotating axis while restricting rotational movement of the hinge cam 30. The angled portions 31 face each other. Each angled portion 31 has a gentle slope 31*a* and a steep slope 31*b* that are asymmetrical sidewise.

The hinge spring 40 is disposed between the hinge cam 30 and the hinge housing 11. One end of the hinge spring 40 contacts the hinge cam 30 and the other end thereof is restricted by the inner surface of the hinge housing 11. Therefore, the resilient force of the hinge spring 40 is exerted along the rotating axis A1. The fixing post 34 prevents deviation of the hinge spring 40.

According to the present invention, the hinge module 10 is assembled by sequentially placing the hinge shaft 20, the hinge cam 30, and the hinge spring 40 within the hinge housing 11 and then covering them with the cover 12.

The hinge module 10 is installed such that when the folder 120 is raised, the angled portion 22 of the hinge shaft 20 runs over the steep slopes 31*b* of the angled portions 31 of the hinge cam 30. Consequently, the folder 120 can be readily opened with a relatively small angle. On the other hand, when the folder 120 is lowered, the angled portion 22 of the hinge shaft 20 runs over the gentle slopes 31*a* of the angled portions 31 of the hinge cam 30. Hence, a movement stroke is increased and the folder 120 is gently closed.

As described above, the hinge module according to the embodiment of the present invention facilitates opening of the folder with a short movement stroke. Additionally, it is to be understood that the present invention is equally applicable to the opening of a flip of a flip-type terminal.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A hinge module for mechanically connecting a main body to a folder in a portable radio terminal, comprising:

a hinge shaft having an angled portion on one end and a shaft on another end opposite the angled portion for rotating with the folder;

a hinge cam facing the hinge shaft and having a pair of angled portions on the surface of the hinge cam facing the hinge shaft, a valley portion between the angled portions, a fixing post along a rotating axis, and a guide protrusion for facilitating sliding of the hinge cam with respect to the hinge shaft while restricting rotational movement of the hinge cam, each angled portion having a gentle slope and a steep slope, the gentle slope and the steep slope being asymmetrical to each other sidewise;

a hinge spring disposed along the rotating axis and having one end connected to the fixing post of the hinge cam, for providing restoring force to the hinge cam; and a hinge housing for sequentially holding the hinge shaft with one end of the hinge shaft protruded, the hinge cam, and the hinge spring.

2. The hinge module of claim 1, wherein when the folder is raised, the angled portion of the hinge shaft runs over the steep slopes of the angled portions of the hinge cam.

3. The hinge module of claim 1, further comprising a hinge cover coupled to the hinge housing for protecting the hinge shaft, the hinge cam, and the hinge spring.

4. The hinge module of claim 1, wherein the gentle slope forms an acute angle and the steep slope forms an angle greater than an angle formed by the gentle slope.

* * * * *